Figure 1:
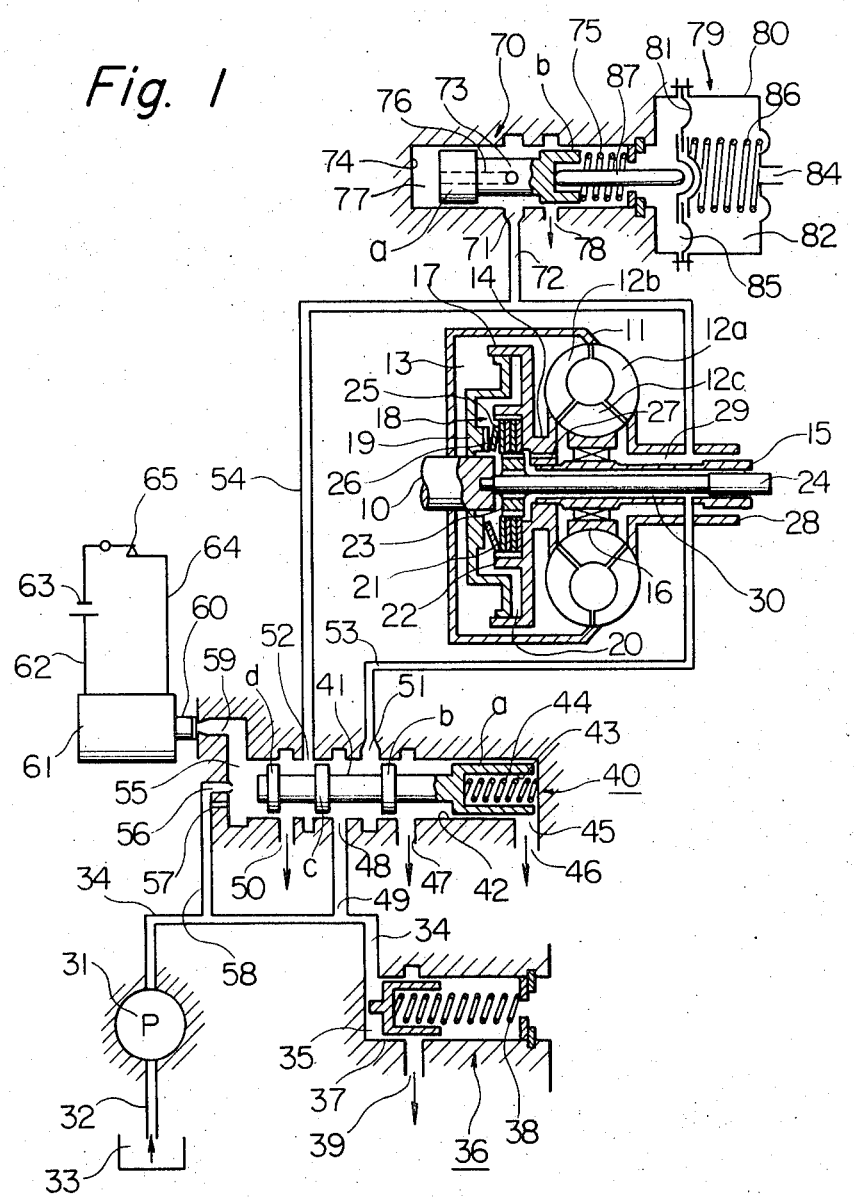

United States Patent [19]
Mori et al.

[11] 3,817,357
[45] June 18, 1974

[54] TORQUE CONVERTER WITH THROTTLE CONTROLLED FLUID CLUTCH

[75] Inventors: Yoichi Mori; Hirohisa Ichimura, both of Yokohama, Japan

[73] Assignee: Nissan Motor Company Limited, Yokohama City, Japan

[22] Filed: Mar. 20, 1972

[21] Appl. No.: 236,133

[30] Foreign Application Priority Data
Oct. 12, 1971 Japan.............................. 46-79897

[52] U.S. Cl................. 192/3.33, 192/.034, 192/86
[51] Int. Cl............................................. F16d 39/00
[58] Field of Search ......... 192/3.33, 3.3, 3.31, 3.29, 192/85 R, 109 F, .034

[56] References Cited
UNITED STATES PATENTS

| | | | |
|---|---|---|---|
| 2,212,740 | 8/1940 | Iavelli........................... | 192/85 R X |
| 2,633,760 | 4/1953 | Kelley........................... | 192/85 R X |
| 2,893,526 | 7/1959 | Smirl............................. | 192/85 R |
| 2,955,482 | 10/1960 | Winchell....................... | 192/85 R X |
| 3,001,415 | 9/1961 | Smirl............................. | 192/3.33 X |
| 3,033,335 | 5/1962 | Hause ............................ | 192/3.33 |
| 3,322,248 | 5/1967 | Kaptur et al.................. | 192/85 R X |
| 3,625,322 | 12/1971 | Nagamatsu..................... | 192/85 R X |

*Primary Examiner*—Benjamin W. Wyche
*Attorney, Agent, or Firm*—Robert E. Burns; Emmanuel J. Lobato; Bruce L. Adams

[57] ABSTRACT

A hydraulic control system for controlling a hydraulic clutch incorporated in a torque converter in a motor vehicle driveline. The control system applies a hydraulic pressure to the torque converter chamber so as to engage the clutch, the hydraulic pressure being modulated in accordance with the intake manifold vacuum or the throttle opening. The clutch is therefore softly engaged when the engine torque is small and quickly and powerfully engaged when the engine torque requirement is large, so that, smooth and strong engagement of the clutch is effected under any mode of operation of the engine.

3 Claims, 2 Drawing Figures

TORQUE CONVERTER WITH THROTTLE CONTROLLED FLUID CLUTCH

This invention relates to motor vehicle drivelines having hydrokinetic torque converters and more particularly to hydraulic control system for controlling a hydraulic clutch incorporated in the torque converter.

The specific purpose of this invention is to provide an improved hydraulic control system which is adapted to control a built-in hydraulic clutch of a torque converter in a motor vehicle driveline. The control system of this invention applies to the torque converter having an enclosure in which a hydraulic pressure is modulated by an engine torque so that the clutch is actuated softly when the engine torque is small and quickly and powerfully when the engine torque is large, smooth, quick and strong engagement of the clutch can therefore be effected under any mode of operation of the engine.

Figure 2:
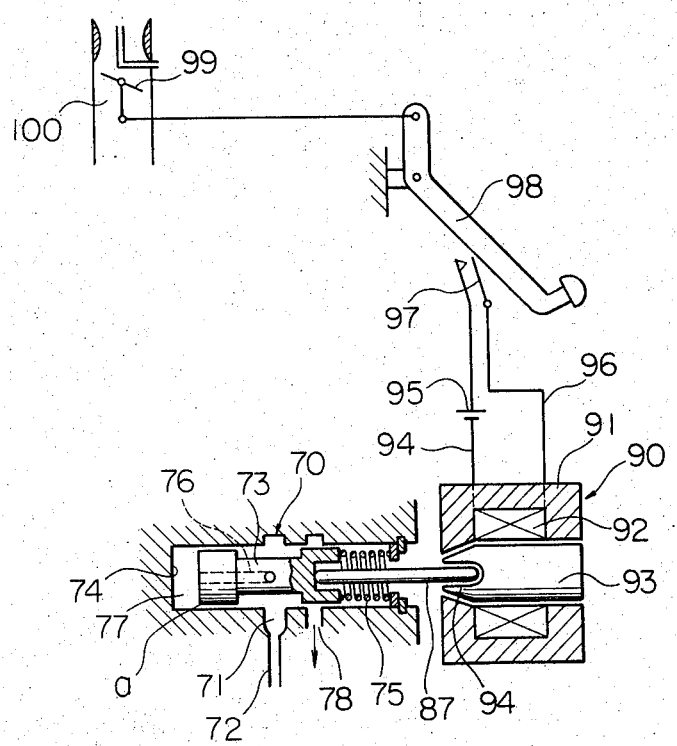

In the drawings:

FIG. 1 is a schematic sectional view of a torque converter having a built-in hydraulic clutch and a hydraulic circuit to control the clutch; and FIG. 2 is a sectional view showing a modification of a part of the circuit shown in FIG. 1.

Corresponding characters of reference designate like parts in the views.

Referring now to FIG. 1, a drive shaft 10 drives a torque converter housing 11 which carries a impeller or pump 12a. The pump 12a circulates fluid in the conventional manner in a torque converter chamber 13 in the housing to a turbine 12b which is connected to one end of a hub member 14 which is rotatably mounted on a stationary hollow shaft 15. A stator 12c is secured to the stationary shaft 15 through a one-way brake 16 which serves to prevent the stator 12c from rotating in a direction opposite to the direction of rotation of the drive shaft 10. The other end of the hub member is formed as an annular cylinder 17 of a hydraulic clutch 18. An annular piston 19 is axially movably mounted in the cylinder 17 suitably sealed at the inner and outer diameters. A clutch chamber 20 is therefore formed between the cylinder 17 and the piston 19. The inner peripheral wall of the cylinder 17 carries clutch elements 21 among which clutch discs 22 are interposed mounted on the clutch hub 23 splined or otherwise secured to the output or driven shaft 24. Between the outermost one of clutch elements 21 and an annular seat of the piston 17 is interposed an annular cushion spring 25 for avoiding unwanted sudden engagement of the clutch elements and discs 21 and 22. A groove 26 is formed in the seat of the piston 16 so as to permit the oil in the clutch chamber 20 to freely flow. The clutch chamber 20 is vented through an aperture 27 formed in the hub member 14. The pump 12a carries a hollow member 28 surrounding the hollow stationary shaft 15 so as to form an oil path 29 between the hollow member 28 and the stationary shaft 15. The oil path 29 communicates with the torque converter chamber 13. The driven shaft 24 and the hollow stationary shaft 15 form therebetween another oil path 30 which communicates with the clutch chamber 20.

The hydraulic clutch 18, which is thus incorporated in the torque converter, is controlled by a hydraulic control system which comprises, as customary, an oil pump 31 which pumps fluid through a conduit 32 from a sump 33 and supplies the fluid to a conduit 34. The pump 31 is connected to and driven by the hollow member 28 connected to the pump 12a of the torque converter. The conduit 34 is connected to a bore 35 at the end of a regulator valve 36 which has a valve element 37 slidably mounted in the bore. The valve element 37 is urged leftwardly of the drawing by a spring 38 which is seated on the valve housing. The bore has a drain port 39. When the hydraulic pressure in the conduit 34 exceeds a certain value, the regulator valve element 37 is forced rightwardly against the force of the spring 38 until the bore 35 communicates with the port 39 so that the fluid in the conduit 34 is exhausted, whereby the fluid pressure in the conduit 34 is maintained substantially constant. The thus regulated hydraulic pressure in the conduit 34 is delivered to a control valve 40 which is provided with a valve element 41. The valve element 41 has equal diameter lands $a$, $b$, $c$ and $d$ located in the bore 42. In the land $a$ is formed a bore 43 wherein a spring 44 is accommodated and is seated on the valve housing. This spring 44 urges the valve element 41 leftwardly. The bore 43 is opened through an aperture 45 at the land $a$ and an exhaust port 46. The groove between the lands $a$ and $b$ communicates with another exhaust port 47. The groove between the lands $b$ and $c$ communicates through a port 48 with a branch 49 which is connected to the conduit 34. The groove between the lands $c$ and $d$ communicates with another exhaust port 50. The bore 42 is further opened to ports 51 and 52 which are respectively associated with the lands $b$ and $c$. The ports 51 and 52 communicate through conduits 53 and 54 to the oil paths 30 and 29, respectively. Chamber 55 communicates through a main orifice 56 and a sub-orifice 57 with a branch 58 which is connected to the conduit 34. The chamber 55 further communicates with a nozzle 59 which faces a plunger 60 of a clutch-off solenoid 61. One terminal of the solenoid 61 is connected through a conductor 62 to a positive terminal of a d-c power source 63. The other terminal is connected through a conductor 64 and a switch 65 to a negative terminal of the power source 63. When the switch 65 is closed, the solenoid 61 is energized by a current flowing therethrough so that the plunger 60 is moved to close the nozzle 59. When the switch is open, the solenoid 61 is de-energized so that the plunger 60 restores the initial position to open the nozzle 59.

A modulator valve 70 has a port 71 communicating through a branch 72 with the conduit 54. The modulator valve 70 is provided with a slidable valve element 73 accommodated in the bore 74 thereof. The valve element 73 is leftwardly biased by a spring 75 seated on the valve housing and has lands $a$ and $b$ which are spaced apart from each other. The groove between the lands $a$ and $b$ communicates through a restricted passage 76 with a chamber 77 at the end of the valve to exert a dampened pressure biasing force on the valve element which is opposed by the biasing force of the spring 75. An exhaust port 78 is associated with the land $b$ of the valve element 73.

A vacuum modulator 79 has a housing 80 which is fast on to the valve housing of the modulator valve 70. A diaphragm 81 divides the housing 80 into a vacuum chamber 82 connected to engine manifold vacuum line 84 and an atmospheric chamber 85 which is open to the atmosphere. The diaphragm 81 is biased by a spring 86 seated on the housing 80. A rigid rod 87 connects the diaphragm 81 to the land $b$ of the valve element 73.

The atmospheric pressure acting to move the diaphragm 81 against the biasing force of the spring 86 reduces a force acting through the rod 87 to bias the valve element 73 to the left. The hydraulic pressure in the conduit 54 is therefore varied in proportion to the intake manifold vacuum.

When, in operation, the clutch pedal (not shown) is depressed, the switch 65 is closed with the result that the solenoid 61 is energized to move the plunger 60 which then blocks the nozzle 59. The hydraulic pressure in the chamber 55 then increases to move the valve element 41 to the right so that the branch 49 communicates with the conduit 53. The hydraulic pressure is then applied through the oil path 30 to the clutch chamber 20. On the other hand, the torque converter chamber 13 is opened through the conduit 54 and the exhaust port 50. Thus, the piston 19 of the clutch 18 is moved to the right thereby to release the clutch 18.

When the clutch pedal is released, the switch 65 is opened so that the solenoid 61 is de-energized to cause the plunger 60 to open the nozzle 59. As a result, the hydraulic pressure in the chamber 55 is decreased with the result that the valve element 41 is moved to the left by the force of the spring 43 whereby the conduit 53 is communicates with the exhaust port 47 and the conduit 54 is connected to the branch 49.

The hydraulic pressure is then applied to the torque converter chamber 13 through the oil path 29. The clutch chamber 20 is, on the other hand, exhausted through the conduit 53 and the exhaust port 47. As a result, the clutch 18 is engaged so as to couple the drive and driven shafts 10 and 24, respectively, with each other. In this instance, it is to be noted that, since the hydraulic pressure established in the torque converter chamber 13 is modulated by the intake manifold pressure, the engagement of the clutch 18 softly effected when the engine torque requirement is small and, on the contrary, quickly effected when the engine torque requirement is large whereby smooth and powerful engagement is achieved.

In FIG. 2, a modification of the modulator valve 70 is shown, wherein the vacuum modulator is replaced by a solenoid assembly 90 which comprises a solenoid 91 having a coil 92 surrounding a core 93. The core 93 is connected with the rod 87 at its recess 94 formed at one end portion thereof. One terminal of the coil 92 is connected through a conductor 94 to a negative terminal of a power source 95. The other terminal of the coil 92 is connected through a conductor 96 and a switch 97 to a positive terminal of the power source 95. The switch 97 is actuated when the accelerator pedal 98 is deeply depressed. The accelerator pedal is connected to a throttle valve 99 in an intake manifold 100 of the engine carburetor.

When, in operation, the accelerator pedal is deeply depressed, the switch 97 is actuated and accordingly the solenoid 92 is energized by a current flowing therethrough so that the core 93 is urged to the left so as to apply a biasing force to the modulator valve element 73. When the accelerator pedal is released, the switch 97 is opened and the solenoid 92 is de-energized to move the core 93 to the right so that the valve element 73 is biased only by the spring 75. Being thus constructed, the hydraulic pressure in the conduit 72 is modulated in accordance with the throttle opening.

It is apparent from the above description that the control system according to this invention is capable of softly actuating the hydraulic clutch and controlling the degree of fluid coupling in the torque converter by means of a reduced hydraulic pressure during coasting or under a small torque requirement condition of the vehicle so that unfavourable shocks can be avoided. Furthermore, the control system is adapted to quickly and forcefully actuate the clutch by means of an increased hydraulic pressure during acceleration or under large torque requirement condition so that quick and sufficient acceleration can be performed.

It will be understood that this invention is not to be limited to the exact constructions shown and described and that various changes and modifications may be made without departing from the spirit and scope of this invention, as defined in the appended claims.

What is claimed is:

1. In combination: a vehicle engine having means defining an induction passage having a throttle valve mounted therein; a rotatable input shaft driven by said engine; a rotatable output shaft; a torque converter having an impeller driven by said input shaft, a turbine driving said output shaft, and a fixed stator; hydraulically actuated clutching means for coupling and uncoupling said turbine and said output shaft, said clutching means comprising means defining a first fluid chamber communicating with said impeller of said torque converter, means defining a second fluid chamber and a movable piston separating said first fluid chamber from said second fluid chamber and movable in response to the difference between the pressures in said first and second fluid chambers; means for selectively applying pressurized hydraulic fluid to said first and second fluid chambers for selectively actuating said clutching means to effect coupling and uncoupling of said output shaft and said turbine; and modulating means for modulating the pressure of the hydraulic fluid supplied to said clutching means and said torque converter to control the rate of actuation of said clutching means and the degree of coupling of said torque converter during coupling of said output shaft and said turbine, said modulating means comprising a valve for selectively varying the pressure of the hydraulic fluid supplied to said clutching means, said valve comprising a valve element movable in one direction to effect an increase in the pressure of the hydraulic fluid and another direction to effect a decrease in the pressure of the hydraulic fluid, and biasing means biasing said valve element in said one direction and comprising a housing, a diaphragm dividing said housing into a vacuum chamber and a pressure chamber, means providing communication between said first fluid chamber and said valve to apply pressure modulated hydraulic fluid from said valve to said first fluid chamber, a rod connecting said diaphragm and said valve element, a spring biasing said diaphragm, said rod and said valve element in said one direction, means providing vacuum communication between said vacuum chamber and said induction passage for selectively applying a vacuum to said vacuum chamber for effecting movement of said diaphragm, said rod and said valve element in said one direction, and pressure means communicating with said pressure chamber for pressurizing said pressure chamber for effecting movement of said diaphragm, said rod and said valve element in said another direction.

2. A combination according to claim 1, wherein said means for selectively applying pressurized hydraulic fluid includes a control valve having a valve element movable between two positions for alternatively enabling fluid communication between said pressurized hydraulic fluid and said first and second fluid chambers.

3. A combination according to claim 1, wherein said means for selectively applying pressurized hydraulic fluid further includes a regulator valve in communication with said pressurized hydraulic fluid and disposed before said control valve to limit the pressure of the fluid supplied thereto.

* * * * *